United States Patent [19]

Hiersig

[11] 3,888,138
[45] June 10, 1975

[54] PLANETARY DRIVE SYSTEM FOR ROLLS IN A MILL

[75] Inventor: Heinz M. Hiersig, Dusseldorf-Oberkassel, Germany

[73] Assignee: Mannesmann-Meer Aktiengesellschaft, Monchengladbach, Germany

[22] Filed: Oct. 4, 1973

[21] Appl. No.: 403,633

[30] Foreign Application Priority Data
Oct. 11, 1972 Germany............................ 2250585

[52] U.S. Cl............ 74/665 G; 74/665 GC; 74/674; 74/397
[51] Int. Cl....................... F16h 37/06; F16h 35/06
[58] Field of Search.......... 74/665 GC, 665 G, 674, 74/682, 397, 785; 72/245, 249

[56] References Cited
UNITED STATES PATENTS

| | | | |
|---|---|---|---|
| 2,603,131 | 7/1952 | Muller, Jr. | 74/674 |
| 2,947,201 | 8/1960 | Lofberg | 74/665 GC X |
| 2,959,983 | 11/1960 | Wise | 74/785 X |
| 3,213,709 | 10/1965 | Bjork | 74/665 G |
| 3,613,853 | 10/1971 | Linthicum et al. | 74/785 X |
| 3,657,940 | 4/1972 | Wagner | 74/397 |

FOREIGN PATENTS OR APPLICATIONS

| | | | |
|---|---|---|---|
| 528,155 | 5/1954 | Belgium | 74/665 GC |
| 1,051,226 | 2/1959 | Germany | 74/665 GC |
| 1,286,492 | 1/1969 | Germany | |
| 1,959,380 | 6/1970 | Germany | 72/245 |

Primary Examiner—Samuel Scott
Assistant Examiner—Lance W. Chandler
Attorney, Agent, or Firm—Ralf H. Siegemund

[57] ABSTRACT

In a drive system for two rolls in a rolling mill wherein at least one roll is journalled for displacement of its axis towards and away from the axis of the other roll, and including a drive motor for both said two rolls; a power branching transmission has a common, single driven input connected to the motor and two drive outputs are coupled to each other for yielding displacement to each other without interruption of driving connection of either output to the driven input; two planetary gears are provided each having a sun wheel, a spider for carrying planet gears meshing the sun wheel and an internal ring gear meshing the planet gears; the spiders of the planet gears are directly connected to the two rolls for driving same, the sun wheels are drivingly connected to the drive outputs of the transmission and the internal ring gears of the planetary gears being held against rotation, the two planetary gears follow the respective mutual displacement of the axes of the rolls.

7 Claims, 2 Drawing Figures ns input shaft to the sun wheel and has the same function as described above for the telescoping shaft. The two adjustments are, of course, carried out concurrently.

PLANETARY DRIVE SYSTEM FOR ROLLS IN A MILL

BACKGROUND OF THE INVENTION

The present invention relates to a power drive system for two rolls which have variable spacing of their axes and use of a common drive motor; specific improvements relate to the transmission and gearing means connecting the motor to the two rolls.

Drive systems of this type referred to above are known in various configurations. For example German printed Pat. application No. 1,286,492 shows a drive system for two rolls with variable spacing of the axes whereby articulated spindles connect the two rolls to the two drive outputs of a power branching and transmission gearing; This arrangement permits considerable changes in the distance between the two rolls without interrupting rotation. However, the total arrangement is quite large.

A somewhat more compact construction relates to gearing for driving the two rolls through gears which can be radially adjusted for taking up any variations in the roll gap and spacing of the axes of the rolls. Rolls geared in that manner permit only limited adjustment of the roll gap because two meshing gears on the roll shafts must maintain engagin disposition. Thickness variations in rolled stock as they occur normally during rolling and which require some yielding of one of the rolls, can be taken up readily by using radially displaceable gears having sufficiently long teeth. Rolls geared to each other and to a common drive in that fashion must maintain driving connection without interruption even if the gap width changes. However, variable back lash will be encountered here. If the gear teeth have configuration which permits such radial changes in the engagement, such as involute gearing, no kinematic disadvantages are encountered when the axes are somewhat shifted apart, as long as they remain parallel. That condition, however, cannot always be guaranteed simply because the rolled stock does not necessarily undergo thickness variations which are uniform over the width of the stock.

The rolls in a mill are usually urged towards each other hydraulically through action on both shaft ends so that occasionally the axes exhibit a skew and tilt. Whenever that is the case, torque is transmitted by a portion of the teeth (axially), even only by an edge thereof, if the elastic limit has been locally exceeded. Accordingly the teeth are locally overloaded, and such overloading cannot be compensated just by using larger teeth, nor will better material provide any relief here. Consequently this kind of drive system experiences continuously difficulties and excessive wear.

SUMMARY OF THE INVENTION

It is an object of the present invention to obviate the drawbacks of the prior art, and to provide for a common drive system of rolls in a mill which does not occupy significantly more space than geared rolls, but without incurring the problems inherent in these systems.

It is, therefor, a specific object of the present invention to provide for a new and improved system for driving rolls in a mill from a common drive wherein adjustment is permitted of the roll gap and of the axes of the rolls to each other over a significant distance.

In accordance with the preferred embodiment of the invention it is suggested to drivingly interconnect two rolls in a mill and a common drive motor in the following manner. A transmission gearing is provided which includes two planetary gears and a power branching and transmission gearing driven from the common drive and driving the two planetary gears; the planetary gears have their spiders or planetary gear carriers directly geared to the roll shafts, and the internal ring gears bear against torque supports. The input shafts of the planetary gears as carrying the respective sun wheels or gears are driven from the branching gears which has a shaft means which in turn may be extended or shortened to offset displacement of the axes of the rolls relative to each other.

The branching transmission has particularly a first shaft coupled to the common motor and carrying a bevel or worm gear for meshing a respective gear on a shaft extending at right angles to the first shaft and carrying the sun wheel of one of the planetary gears. A second shaft is telescoped and, possibly, articulated to the first shaft for rotation therewith, and it carries another bevel or worm gear for meshing a respective gear on a shaft extending at right angles to the first and second shafts and carrying the sun wheel on the other planetary gear. The telescoped shafts take up any displacement of the planetary gears and of the rolls relative to each other.

The inventive features permit construction of a drive system for rolls in a mill which fulfills the stated objectives. The system does not only permit readily initial adaption of the construction to the dimensions of the mill, but synchronous driving of the rolls is continued even when the rolls change distance from each other for any of the stated reasons.

The inventive construction occupies little space because the compact construction of planetary gears is particularly taken advantage of. Most importantly here, the two planetary gears have to be rated only for the one-fold torque of the respective roll. Previous front end drives required rating for twice that torque and the transmission gear had to have twice the normal width. Planetary gears provide significant speed reduction and can be driven at a high speed accordingly. This in turn is beneficial for the construction and dimensioning of the branching transmission. The outputs of the planetary gears (spiders) are directly connected to the roll shafts, i.e., seated thereon and secured thereto without requiring special couplings. Such couplings are usually quite expensive beacuse of the high torque at these points. This holds particularly true if the axes of the rolls tilt.

The casing of the planetary gears holding the internal ring gears are supported to prevent turning. A particularly advantageous support is provided here by means of rather long lever arms on these casings and having pins at their ends which traverse and slide in guide slots on bolted down members (at least one being bolted down). The pin-slot arrangement takes up any displacement of the rolls to each other; but usually only one roll is displaceable. The pins extend preferably in the same plane which is defined by the two parallel axes of the rolls, and one member is preferably adjustible transversely thereto.

The height adjustment of the one member actually amounts to a short range turning of the one casing of the planetary gear, and that in turn turns the one roll azimuthally relative to the other one for purposes of circumferential adjustment. This adjustment feature is of particular advantage for oval briquette press rolling, wherein rolls have complementary mold cavities. Their mutual "phase" must be accurately adjusted to obtain a good seam in the briquettes.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings FIG. 1 illustrates a first roll 1 whose axes is not subject to displacement, whereas a second roll 2 is mounted for lateral displacement of its axis. Particularly, roll 1 has its shaft 3 journalled in stationary and fixed bearings 5, while shaft 4 of roll 2 is mounted in bearings 6 which can be displaced by means of hydraulic cylinder piston arrangements. The bearings are held by piston rods 7, while the cylinders and piston chamber bear against stationary parts 9 of the mill stand.

Figure 1:
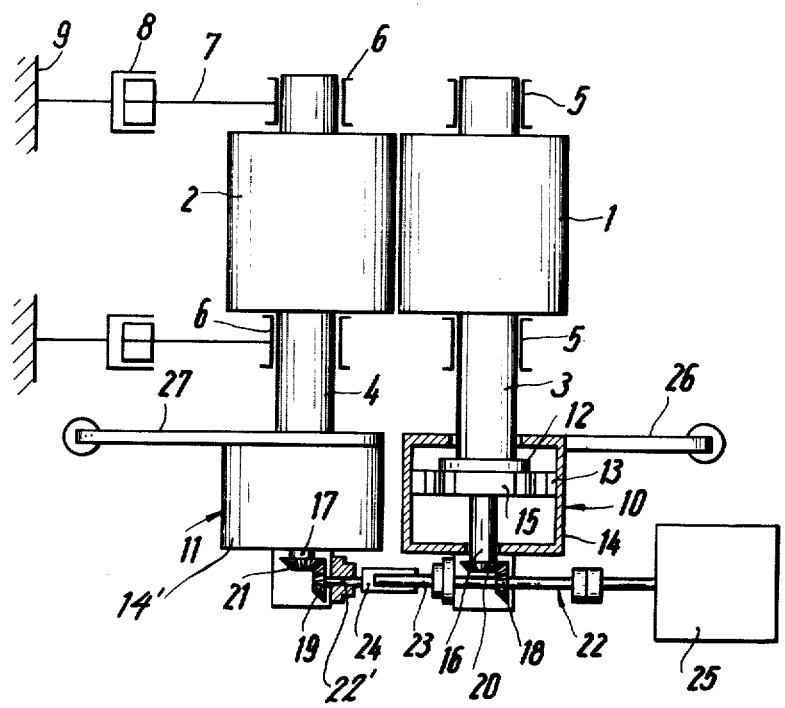
FIG. 1 is top view, somewhat schematically of a drive system in accordance with the preferred embodiment of the invention.

Reference numeral 25 denotes the drive motor for the rolls, and the arrangement to be described next serves to drivingly link common drive motor 25 to rolls 1 and 2. The transmission provided for that purpose includes two planetary gears 10 and 11 which are driven by motor 25 via a power branching, transmission gearing.

Particularly, motor 25 drives a first shaft 22 (via a clutch or coupling) and a bevel gear 18 is mounted on shaft 22 for rotation therewith. Two telescopically arranged and keyed portions 23, 24 interconnect first shaft 22 with a second shaft 22¹ which in turn carries a bevel gear 19. Shafts 22 and 22¹ are respectively journalled in extentions of casings 14, 14¹ on the two planetary gears. The telescopic arrangement is selected to take up any differences in the distance between the roll shaft axes that can be expected.

This telescopic arrangement suffices if the guide parts for the displaceable bearing 6 of roll 2 are constructed to positively ensure that the axis of roll 2 remains parallel to the axis of shaft 1. If, however, that assumption cannot be made, then it is necessary to provide for articulated linkage between shaft 22¹ and shaft 22 for the following reasons:

Generally speaking the two shafts 22, 22¹ have colinear axes, but if the casing 14¹ is somewhat tilted, that tilt is transferred to shaft 22¹ and for this reason articulation may be needed between shafts 22 and 22¹. Such tilting may occur if for reasons outlined above the two rolls assume a somewhat tilted or skewed position to each other because of thickness variations in the rolled stock.

Bevel gear 18 meshes a bevel 20 on input shaft 16 for planetary gear 10, while bevel 19 meshes a bevel 21 on input shaft 17 for planetary gear 11. Both planetary gears are constructed similarly so that only one needs to be described in detail.

In lieu of bevel gearing, one could employ worm gears on shafts 22, 22¹. In either case, power is branched off shafts 22, 22¹ at right angles thereto and at a spacing that corresponds to the spacing and distance of the axes of the rolls, because the shafts 16 and 17 are respectively coaxially therewith.

Shaft 16 carries sun wheel or gear 15 of the planetary gear 10 and meshing with the planet gears thereof which in turn run on internal ring gear 13 which is secured to casing 14 of planetary gear 10. The spider 12 carries the planet gears and is mounted directly on shaft 3 for rotation therewith. The spider 12 may actually be directly bolted to the one axial end of the shaft 3 of roll 1. Housing 14 is held against torque by support 26. Planetary gear 11 analogously couples shaft 17 to shaft 4. The spider of planetary gear 11 is also directly connected e.g. bolted to the shaft 4 or roll 1. The casing 14¹ for that gear 11 bears against torque support 27 preventing also its rotation.

It can readily be seen that the entire arrangement 2-6-4-11-21-19-22¹ is displaceable without interruption of the driving connection. The articulation between shafts 22, 22¹ permits the axes of roll 2 to tilt slightly relative to the axes of roll 1.

Figure 2:
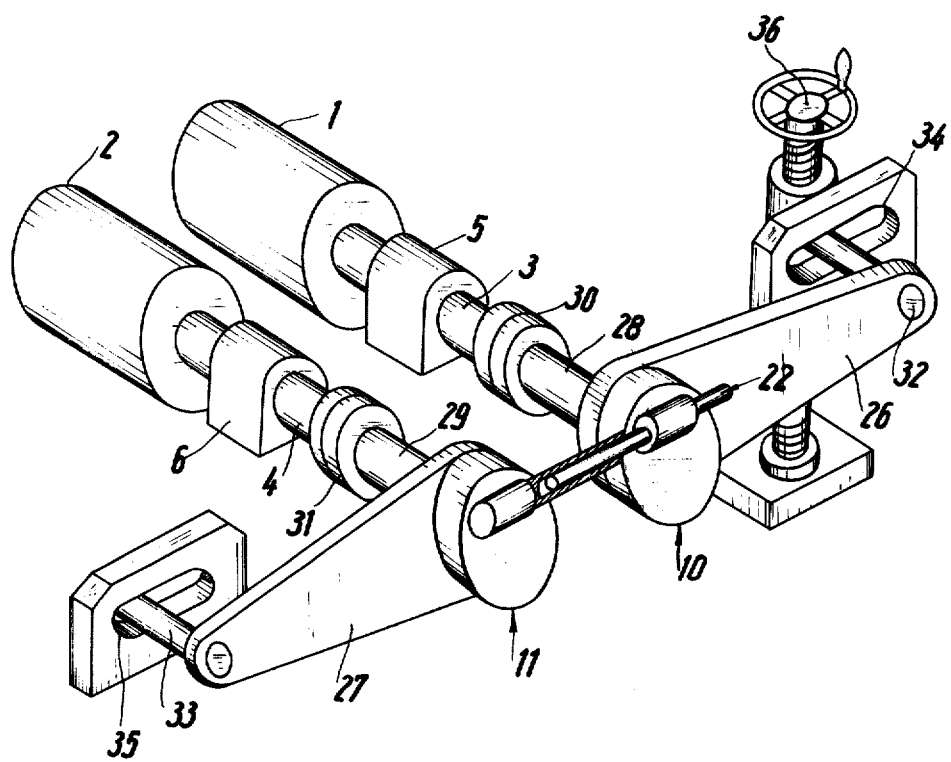
FIG. 2 is an isometric view of an improved version of the construction of FIG. 1.

FIG. 2 shows an arrangement which is similar to FIG. 1 in many respects, but the planetary gears 10 and 11 are connected to intermediate shafts 28, 29 which in turn connect to the roll shafts 3, 4 via simple rigid couplings 30, 31. These couplings may simply be comprised of shaft end flanges which have been bolted together.

The input shafts of the planetary gears are driven as before and the drive motor has been omitted for clarity of illustration. Of greater import here is the torque support. The support arms 26 and 27 are constructed as rather long lever arms with bolts or pins 32, 33 at the respective end. These bolts traverse slots 34, 35 in appropriate stationary members, and are slideable therein. The member with slots 35 is bolted down at a level, so that the pin's axis is, approximately at least, in the common plane of the axes of the two rolls.

The other slot defining element 34 as associated with roll 1 can be adjusted as to height by means of an adjustment spindle 36 with hand wheel. Such an adjustment will turn lever arm 26, and casing 14 of planetary gearing 10 is turned accordingly. It will be recalled that the internal ring gear of the planetary gear is secured to that casing so that a turning motion is superimposed here, turning the roll 1 without imparting similar rotation to roll 2. Thus, the phase of the two rolls is adjusted which may be of advantage (or even necessary) if the rolls are provided for briquette pressing.

The invention is not limited to the embodiments described above but all changes and modifications thereof not constituting departures from the spirti and scope of the invention are intended to be included.

I claim:

1. In a drive system for two rolls in a rolling mill wherein at least one roll is journalled for displacement of its axis towards and away from the axis of the other roll, and including a drive motor for both said two rolls, comprising:

a first and second planetary gear each having a sun wheel, a spider for carrying planet gears meshing the sun wheel, and an internal ring gear meshing the planet gears, the spiders of the planet gears being respectively directly connected to the two rolls in coaxial relation to the respective roll for driving same;

a power branching transmission with a common, single, driven input connected to said drive motor and having shaft means extending transversely to said roll axes and having two driving outputs each providing a rotational output correspondingly effective transversely to said shaft means, said driving outputs being respectively connected to said sun wheels for driving same, said shaft means constructed for yielding displacement of the driving outputs relative to each other along the axial extension of the shaft means and following any displacement of said roll axes away from or towards each other, to maintain driving connection between the driven input and said driving outputs without interruption upon occurrence of said displacement;

and means for holding the internal ring gears of the planetary gears against rotation, the first and second planetary gears following the respective mutual displacement of the axes of the rolls.

2. In a system as in claim 1, wherein the shaft means is constructed for articulated rotation to become effective upon tilting of said axes to each other.

3. In a drive system as in claim 1, wherein said transmission includes a first shaft directly coupled to said motor;

a first gear on the first shaft and meshing a first gear on a shaft of the first planetary gear carrying the sun wheel thereof;

a second shaft telescopically coupled to the first shaft for rotation therewith and axial displacement thereto; and a second gear on the second shaft and meshing a second gear on a shaft of the second planetary gear carrying the sun wheel thereof.

4. In a system as in claim 3, wherein said first and second gears are bevel gears.

5. In a drive system for two rolls in a rolling mill wherein at least one roll is journalled for displacement of its axis towards and away from the axis of the other roll, and including a drive motor for both said two rolls, comprising:

a power branching transmission with common, single driven input and two drive outputs coupled to each other for yielding displacement to each other without interruption of driving connection of either output to the driven input, the driven input being connected to the drive motor for being driven therefrom;

a first and a second planetary gear each having a sun wheel, a spider for carrying planet gears meshing the sun wheel, and an internal ring gear meshing the planet gears, the spider of the planet gears being respectively directly connected to the two rolls for driving same, the sun wheels of the planetary gears being respectively drivingly connected to the two drive outputs of said transmission, the planetary gears each following the respective internal ring gears therein against rotation; and means coupled to at least one of the ring gears to provide thereto rotational adjustment to change the angular phase of the respective one roll relative to the other one.

6. in a system as in claim 5, wherein each said planetary gear has a casing to which the respective internal ring gear is affixed, a lever on said casing with a pin, and a member for each said pins, with an elongated guide slot traversed by the respective pin and holding the lever against rotation, the pins being, approximately at least, located in the plane of the axes of said rolls.

7. In a system as in claim 6, wherein one of said members is adjustible transversely to said plane.

* * * * *